March 17, 1931.  C. E. JOHNSON  1,796,792
OIL CONSERVING PISTON
Filed May 12, 1930
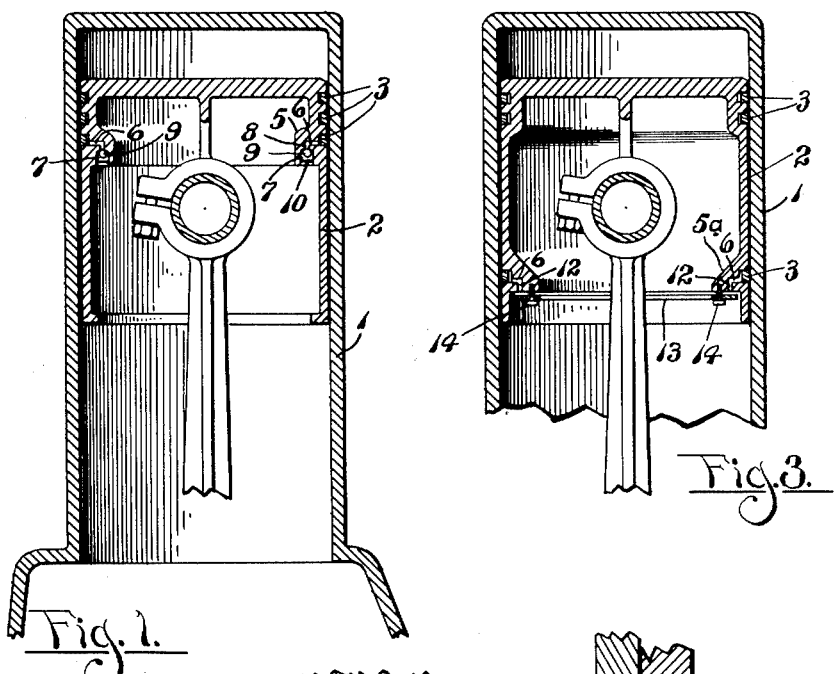
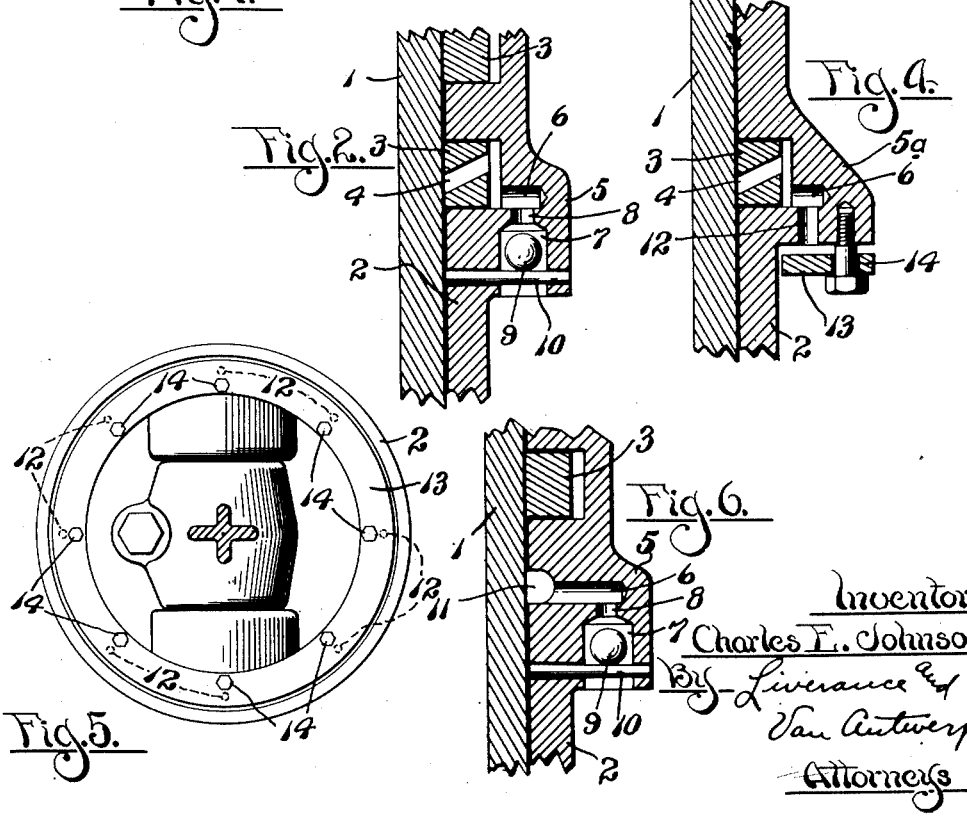
Inventor
Charles E. Johnson
By Liverance and
Van Antwerp
Attorneys Patented Mar. 17, 1931

1,796,792

UNITED STATES PATENT OFFICE

CHARLES E. JOHNSON, OF MUSKEGON, MICHIGAN

OIL-CONSERVING PISTON

Application filed May 12, 1930. Serial No. 451,800.

This invention relates to a construction of oil conserving piston. In internal combustion engines particularly, though the same is true to a less degree in many other types of engines, there is a considerable consumption of lubricating oil at the higher speeds of the engine. Attempts to save oil and obviate the passage thereof by the piston to the combustion chamber of the engine have been made by making drainage openings through the sides of the piston from the bottom of a ring groove through the piston wall to the interior thereof, the theory being that oil scraped from the inner walls of the cylinder in which the piston operates will be carried through said drainage openings to the interior of the piston and therefrom to the engine crank case.

This form of construction for conserving oil has proved reasonably satisfactory for the lower speeds of the engine but at the higher rates of speed, it is practically valueless for the reason that on the downward stroke of a piston at high speed the air is trapped underneath the piston and compressed to a greater or less degree by the rapid downward piston movement and due to the inertia of the air whereby the air is forced through the drainage openings and the oil driven back into the ring grooves and therefrom to the walls of the cylinder while on the upward movement of the piston there is a suction tending to draw the oil to the interior of the piston, the result being that the rapid reciprocation of the piston causes the oil to surge back and forth through said drainage openings to the wall of the cylinder without carrying the same inside the piston to pass to the crank case. And at such high speeds there is much greater consumption of lubricating oil due to the same passing by the piston to the combustion chamber of the engine, the effect of high speed in an engine making the present oil drainage constructions practically valueless for high speeds.

It is a primary object and purpose of the present invention to provide an oil conserving piston wherein the oil, which is taken from the inner walls of the cylinder, may pass freely through drainage passages in the sides of the piston at the bottom of an oil collecting groove, preferably, the lower ring groove or any additional groove made in the piston, but with the provision of means acting automatically, on the down stroke of the piston, to close all of the passages and prevent the pressure of air within the piston from forcing the oil back through said groove and out of the same and against the walls of the cylinder, said means being effective at all speeds of the engine and particularly effective at the higher speeds thereof.

There are many ways in which this object and purpose may be attained and I have illustrated some thereof in this application, others being shown in copending applications directed to other specific forms of construction. An understanding of the invention may be had from the following description taken in connection with said drawing, in which, Fig. 1 is a vertical section illustrating a cylinder of an internal combustion engine having a reciprocating piston therein made in accordance with my invention.

Fig. 2 is a fragmentary enlarged vertical section illustrative of the construction applied to the piston for automatically preventing back movement of the oil to the walls of the cylinder.

Fig. 3 is a fragmentary view similar to that shown in Fig. 1, showing a different form of construction used for attaining the same end and operating upon the same principle as is the construction illustrated in Figs. 1 and 2.

Fig. 4 is a fragmentary enlarged vertical section similar to that shown in Fig. 2 but with respect to the different form of the invention shown in Fig. 3.

Fig. 5 is an enlarged under plan view of the piston shown in Fig. 3, and

Fig. 6 is a fragmentary vertical section similar to that shown in Fig. 2 illustrating an embodiment of the invention in which the oil is collected in a groove in the piston other than a piston ring groove.

Like reference characters refer to like parts in the different figures of the drawing.

The cylinder 1 of an internal combustion engine has a piston 2 mounted for reciprocatory movements therein, said piston being equipped with the usual ring grooves in which piston rings 3 are carried. The lowermost ring 3 is of an oil drainage construction having a plurality of upwardly extending slots 4 cut therethrough in accordance with my Patent No. 1,558,091, issued October 20, 1925. The invention, however, is not limited in any respect to the use of a piston ring or to a piston ring of the specific construction illustrated.

At the inner side of the piston at and below the plane of the lowermost ring the piston is provided with an inwardly extending annular thickened portion 5 into which at any desired number of points around the ring, drainage passages 6 may be made from the lower portion of the lowermost piston ring groove. These passages 6 extend partly through the enlargement 5. Relatively large openings 7 are bored upwardly from the bottom of said enlarged portion 5 toward the passages 6 and are connected therewith at their upper ends by reduced openings 8 as best shown in Fig. 2. In each of the larger openings 7 a ball valve 9, of any suitable material, is positioned which is held from dropping out of the opening in which placed by any desired retaining means, such as a rod or pin 10 extending across each opening 7 below the ball valve 9.

It is evident that with this construction, on the upward movement of the piston the ball valves 9 both through gravity and through inertia of the balls will remain in lower position against the rods 10 and that the passages from the lowermost ring grooves will be open for the passage of oil to the interior of the piston; but that on a reverse movement, when the piston has attained a high speed, the balls will be brought against the lower ends of passage 8 closing the same and preventing the air underneath the piston forcing oil which has been collected out of the piston ring groove and against the cylinder walls.

In Fig. 6 a slight modification is made in that the groove 11 from which the passages 6 lead is not a piston ring groove but is merely an oil collecting groove in the piston in which the oil collects on the down stroke of the piston and is forced through the grooves into the interior thereof. It is not essential that a ring groove with a piston ring therein be used for carrying out my invention.

In Figs. 3, 4 and 5 a different embodiment of the invention is shown wherein the inwardly extending annular portion 5a on the piston is located toward the lower end of the piston in a plane below the wrist pin bosses, and a groove for holding a drainage ring 3 is made opposite said portion 5a from which a plurality of passages 6 extend into the part 5a, there being vertical passages 12 from the bottom of the part 5a joined with said passages 6.

A continuous flat metal ring 13 is located under said inwardly extended part 5a and is held in position by a plurality of shouldered studs 14 which pass loosely through the ring 13 and thread into said part 5a. The shoulders of the studs engage against the underside of the inwardly extending portion 5a so that, normally, when the ring 13 rests against the heads of the studs 14 its upper side is spaced a short distance from the lower side of said part 5a leaving a free passage for oil to the interior of the piston during the up stroke of said piston. But on the down stroke the rapid speed of the piston and the inertia of the ring 13, as well as air resistance, causes it to move upwardly relative to the piston and bear snugly against the under side of said part 5a and close the passages 12.

It is evident from the foregoing that with my invention the back and forth surging of oil in the drainage passages through the piston at the high speeds of the engine is completely eliminated. The drainage passages are open at the time when oil is collected and forced thereinto and automatically closed at the time when the air pressure within the piston would tend to force the oil outwardly and against the cylinder walls. The constructions which have been described are of relatively simple and economical character to build, are very practical and are an absolute insurance against excess use of oil in internal combustion engines with the consequent smoky exhaust and formation of carbon in the combustion chambers of the engine. The invention is capable of embodiment in many different forms other than those specifically described. I, accordingly, am not to be limited to the specific forms of construction disclosed but the invention is to be considered comprehensive of all forms of structure coming within the scope of the claims appended hereto.

I claim:

1. A vertical piston having an oil collecting groove around the same and oil drainage passages extending from said groove and opening into the interior of the piston, said passages terminating in downwardly extending portions, and means movably mounted underneath the lower ends of said terminal portions, passages normally dropping by gravity to open the same and occupying a lower position on upward movement of the piston, and automatically coming into closing engagement with the lower end of said terminal portions, passages on movement of the piston in a downward direction.

2. A construction containing the elements in combination defined in claim 1, combined with means for supporting said passage closing means in a lower position and at a predetermined distance from the lower ends of said second mentioned passages.

3. A vertical piston having an oil collecting groove and oil drainage passages extending from said groove and opening into the interior of the piston, said passages terminating in downwardly extending portions, balls adapted to close the terminal ends of the several passages and means to support the balls adjacent said ends to prevent downward movement of the same.

4. A vertical piston having an oil collecting groove and oil drainage passages extending from said groove and opening into the interior of the piston, said passages terminating in downwardly extending portions, a flat ring adapted to close the several terminal ends of the passages, and means to support the ring adjacent the ends of the passages, said means preventing excessive downward movement of the ring but allowing upward movement whereby the passages may be closed when the ring moves upwardly relative to the piston.

In testimony whereof I affix my signature.

CHARLES E. JOHNSON.